W. W. CURTIS.
COMBINATION PLOW AND PULVERIZER.
APPLICATION FILED JAN. 5, 1918.
1,276,334.
Patented Aug. 20, 1918.
2 SHEETS—SHEET 1.
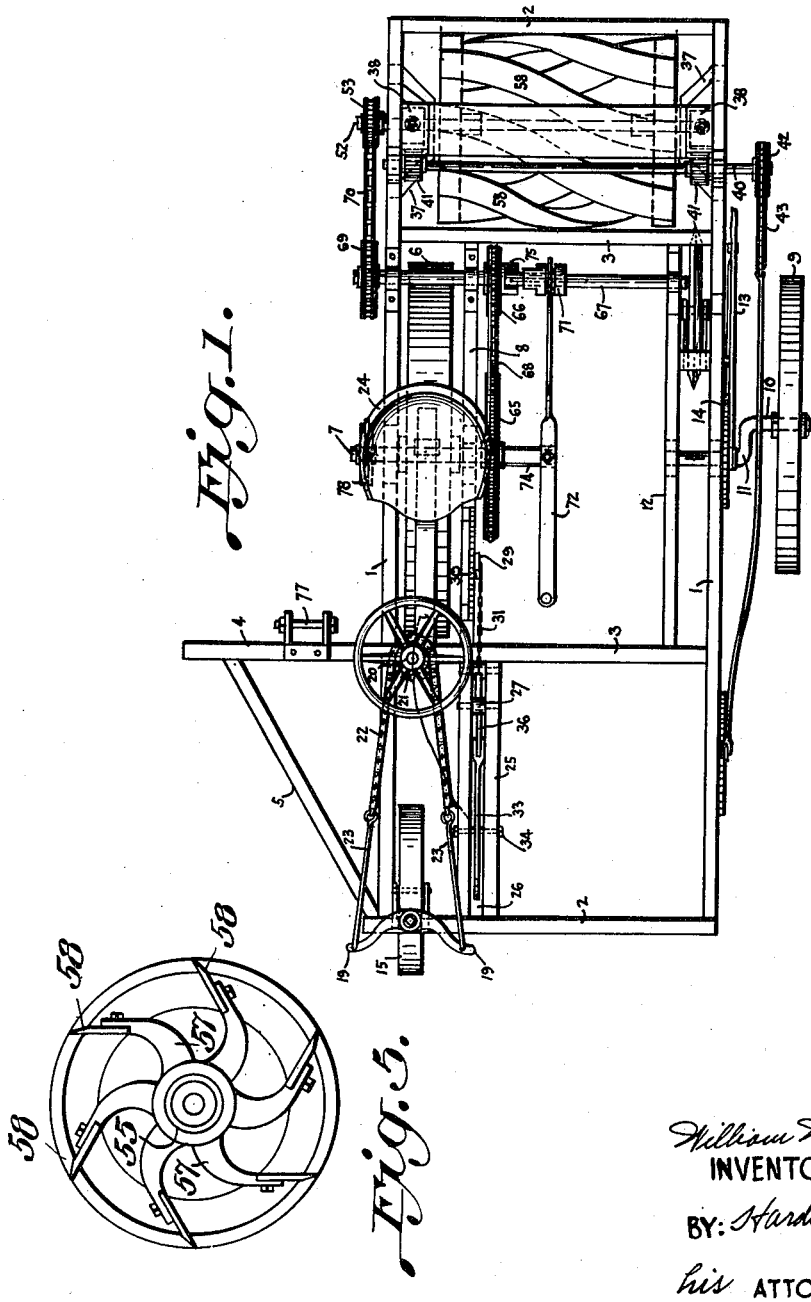

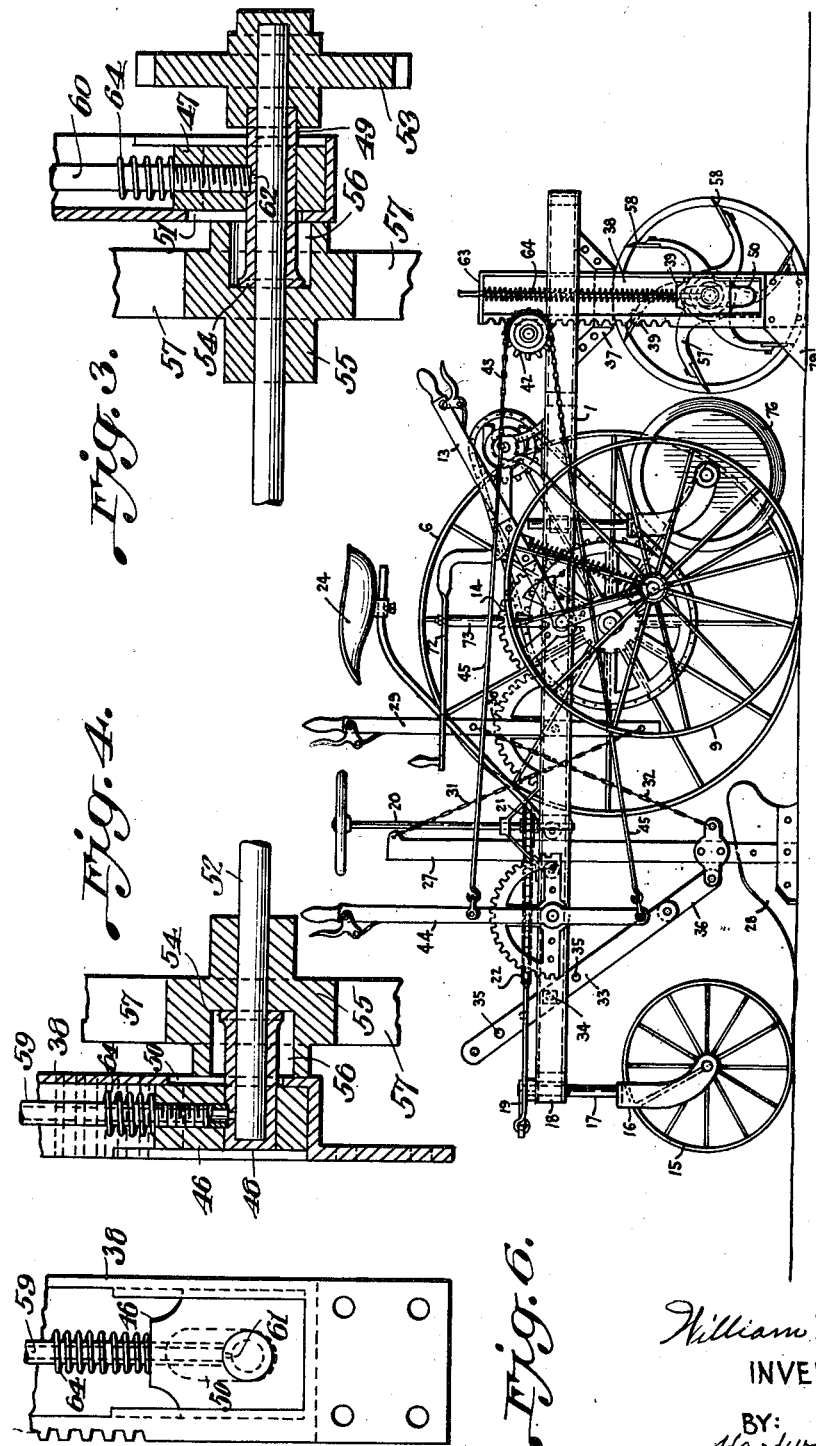

UNITED STATES PATENT OFFICE.

WILLIAM W. CURTIS, OF WILLIS, TEXAS.

COMBINATION PLOW AND PULVERIZER.

1,276,334.

Specification of Letters Patent. Patented Aug. 20, 1918.

Application filed January 5, 1918. Serial No. 210,420.

*To all whom it may concern:*

Be it known that I, WILLIAM W. CURTIS, citizen of the United States, residing at Willis, in the county of Montgomery and State of Texas, have invented certain new and useful Improvements in Combination Plows and Pulverizers, of which the following is a specification.

This invention relates to a new and useful improvement in a cultivator.

The object of the invention is to provide an implement of the character described whereby the ground to be cultivated will be thoroughly pulverized and left in a comparatively smooth condition, and ready to receive the seed. Another feature of the invention resides in the provision of means whereby the depth at which the ground is cultivated may be readily controlled.

With the above and other objects in view, the invention has particular relation to certain novel features of construction, operation and arrangement of parts, an example of which is given in this specification and illustrated in the accompanying drawings wherein:—

Figure 1, is a plan view of the device.

Fig. 2, is a side elevation thereof.

Figs. 3 and 4, respectively, show fragmentary sectional views of the drum bearings.

Fig. 5 shows an end view of a drum, and

Fig. 6, shows a side elevation of one of the drum bearings.

Referring now, more particularly to the drawings, wherein like numerals of reference designate similar parts in each of the figures, the numerals 1, 1 refer to the side members of the framework which are connected by the end members 2, 2, said framework also including the intermediate crossbars 3, 3, one of which is extended forming the arm 4, which is strengthened by the brace 5. A comparatively large supporting wheel 6, is provided which is fixed on the axle 7, said axle being rotatable in suitable bearings carried by one of the side members 1, and the bearing support 8, respectively, said support being spaced from said side member and being anchored to the crossbars 3, 3 and at its forward end to the front end member 2. The opposite side of the frame is supported by a comparatively small supporting wheel 9, which is rotatable on the spindle 10 of the elbow 11. This elbow is mounted in bearings carried by the corresponding side member 1, and the parallel support 12 which is spaced therefrom, the ends of said support being anchored to the respective crossbars 3, 3. A manual lever 13 is fixed to the elbow 11, and by its manipulation, said elbow may be turned in its bearings and the supporting wheel 9 thereby elevated and lowered relative to the corresponding side of the framework. The manual lever 13 may be fixed in any desired position by means of the usual rack-and-dog arrangement 14. Provision is thus made for the adjustment of the framework, relative to the ground surface which will be made necessary in cultivating ground of uneven or sloping surface. At the front end of the frame, there is a steering wheel 15, which is rotatably mounted between the spaced arms 16, into which the lower end of the vertical shaft 17 is formed. This shaft is rotatable in a vertical bearing 18, and its upper end has the lateral arms 19, 19. A steering post 20 is provided which is mounted in vertically alined bearings, and fixed upon this post is a sprocket wheel 21 which operates the sprocket chain 22, which is connected at its respective ends to the free ends of the corresponding arms 19, 19 through the links 23, 23, and through the mechanism described, the machine may be guided by the operator who will be mounted in the seat 24. Spaced from the bearing support 8 and anchored at its respective ends to the crossbar 3 and the front member 2 is the bar 25, forming between it and the support 8 a long bearing 26 and vertically movable in the rear end of this bearing is the stock 27, whose lower end carries the share 28, alined in front of the main supporting wheel 6. A manual lever 29 is pivoted at an intermediate point, to the bearing member 8 and this lever may be fixed in any desired position by means of the usual rack-and-dog arrangement 30. A pair of chains 31 and 32 are provided which are attached to the upper and lower ends, respectively, of the stock 27, at one end and whose other ends are attached to the manual lever 29 below and above the points of attachment to the bearing 8, respectively. An anchor bar 33 extends through the bearing 26 and is bolted therein by means of the bolt 34, said bearing being provided with a plurality of openings 35, spaced apart and provided to receive the bolt 34 to admit of the adjustment of said anchor bar. The lower end of this anchor bar is connected to the lower end of the stock 37 by means of a link 36. A rearward pull on the lever 29 will operate to the chain 32 to elevate the share 28, and when said lever is manipulated forwardly, it will operate through the chain 31 to lower the share.

The rear end of each side member 1, 1 is provided with a vertical bearing 37, and in these respective bearings are the vertical supports 38, 38 formed of channel iron. The front side of each support is formed into a rack face 39, and a transverse shaft 40 has the spur gear wheels 41, 41 fixed thereon, and in mesh with the corresponding rack face. One end of the shaft 40 is extended and has the sprocket wheel 42 fixed thereon over which operates this sprocket chain 43. Pivoted to the corresponding side member 1, is a manual lever 44, and the corresponding ends of the sprocket chain 43 are connected to this lever above and below the point of attachment to the side member 1, by means of the rods 45, 45. By the manipulation of the lever 44 back and forth, the shaft 40 will be rotated correspondingly through the instrumentalities just described, and the supports 38, 38, elevated and lowered. The lower ends of the supports 38, 38 carry the vertically, slidable bearing blocks 46 and 47, which carry the respective thimbles 48 and 49. These thimbles project through the respective oblong slots 50 and 51 of the supports 38, 38, and form bearings in which the drum shaft 52 rotates. The outer end of the thimble 48, is closed but the outer end of the thimble 49 projects out beyond the corresponding support 38, and is open, but the corresponding end of the drum shaft 52 projects beyond said thimble and fixed on said projecting ends is the sprocket wheel 53, the inner end of whose hub is formed with a recess to receive the outer end of the thimble 49. The inner ends of the thimbles 48 and 49 are provided with annular flanges 54, 54, and fixed upon the shaft 52 are the hubs 55, 55, which fit against the inner sides of the corresponding supports 38, 38, and have the recesses 56, 56, which receive the inner ends of said thimbles. The bearings of the shaft 52 formed by the said thimbles are thus protected from sand, and dirt, and other foreign matter. The hubs 55, 55 have radiating arms 57, designed to support the spiraled cutters 58, which are secured thereto at their respective ends. The upper sides of the thimbles 48 and 49 have shallow recesses, and the lower ends of the respective tubes 59 and 60 are threaded down through the blocks 46 and 47 and are seated in said recesses to hold the thimbles firmly in place. The bearings are lubricated through said tubes, the lubricant passing through the ducts 61 and 62. The tubes 59 and 60 play through bearings, as 63 in the upper ends of the supports 38 and coil springs 64, 64 surround said tubes and are interposed between said bearings 63 and the corresponding blocks 39 and operate to hold the cutter blades yieldably against the ground.

Fixed upon the axle 7 is the sprocket wheel 65, and in alinement therewith is the sprocket wheel 66, which is loosely mounted upon the counter shaft 67, rotatable in suitable bearings carried by the framework and operating over the sprocket wheels 65, 66 is the sprocket chain 68. Fixed upon the counter shaft 67, and in alinement with the sprocket wheel 53 is the sprocket wheel 69, and operating over said sprocket wheels is the sprocket chain 70, which transmits rotation from the latter to the former. Splined on the counter shaft 67, is a clutch member 71, which is manipulated through the manual lever 72, this manual lever being pivoted to the upper end of the post 73 which has a bearing 74 on the inner end of the axle 7. The hub of the sprocket wheel 66 is formed into a clutch member 75, with which the clutch member 71 may be engaged through the manual lever 72, and when so engaged, the shaft 67 is forced to rotate with said sprocket wheel 66, and rotation is thereby imparted to the drum carrying the blades 68. When the clutch member 71 is disengaged from the clutch member 75, the sprocket wheel 66 runs idle and the cutter-carrying drum remains at rest. A coulter 76, disklike in form and having a sharp cutting edge depends from the framework, and is provided to cut the sod or hard surface of the ground in advance of the corresponding end of the cutter-carrying drum, and the lower end of the corresponding support 38 carries a cutting blade 79, which follows said coulter and is provided to sever roots, or obstructions encountered.

The arm 4 is provided with a clevis 77 to which a drill or planter may be attached whereby the ground may be seeded as the plowing progresses, and the outer end of the axle 7 has a sprocket wheel 78 fixed thereon through which the drill or planter may be operated.

The operation of the implement is as follows:—When plowing is first begun, the share 28 is lowered somewhat lower than the wheels 6 and 15. This is accomplished by manipulating the lever 29 forwardly and by a suitable adjustment of the anchor bar 33. The land to be cultivated is then plowed around forming a furrow for the wheel 6 to travel in. When the first round is completed, the share 28 is readjusted to its original position, and thereafter moves in front of the wheel 6 to remove clods, stones and other obstructions, and to prepare a smooth track for the wheel 6. By a suitable manipulation of the lever 44, the cutter-carrying drum is lowered so that the blades 58 will enter the ground to the desired depth, and as the machine moves forward, these blades will cut up and pulverize the ground surface and remove all clods therefrom and leave the same in a smooth condition, and ready to receive the seed. While being operated, the side of the framework supported by the wheel 9 may be adjusted to the proper elevation by means of the manual lever 13 in accordance with the inclination of the surface of the ground being cultivated.

What I claim is:—

1. In the device of the character described, including a framework, a pair of vertically adjustable supports carried thereby, and spaced apart, bearing blocks slidable in said supports, thimbles arranged in said blocks and forming bearings, a drum shaft whose respective ends rotate in said thimbles, a tubular member threaded into each block at one end, and whose other end operates through a bearing in the corresponding support, yieldable members surrounding said tubular members and interposed between said last mentioned bearings and said blocks, said thimbles being provided with ducts to permit the flow of a lubricant from said tubular members into said shaft bearings, a cutter-carrying drum fixed upon said shaft whose hubs are provided with recesses to receive the outer ends of said thimbles and cutter blades carried by said drums.

2. A device of the character described including a framework, a pair of vertically adjustable supports carried thereby and spaced apart, thimble-like bearings slidably mounted in said supports, a drum shaft whose respective ends rotate in said bearings, tubular members communicating with respective bearings at one end and whose other ends operate through bearings in the corresponding supports, yieldable members surrounding said tubular members and interposed between the respective bearings thereof, a cutter carrying drum fixed upon said shaft, whose hubs are provided with recesses to receive the outer ends of said thimble bearings and cutter blades carried by said drums.

3. A device of the character described including a framework, a pair of vertically adjustable supports carried thereby, a bearing block slidably mounted in each support, thimbles fixed in said blocks and forming bearings, a drum shaft whose respective ends operate in said thimbles, a cutter carrying drum fixed on said shaft whose hubs are provided with recesses to receive the outer ends of said thimbles which project beyond their corresponding supports, cutter blades carried by said drum and resilient members operating against the blocks to hold said drum yieldably against the ground surface.

In testimony whereof I have signed my name to this specification in the presence of two subscribing witnesses.

WILLIAM W. CURTIS.

Witnesses:
A. E. DAWES,
E. V. HARDWAY.